US00RE46359E

(19) United States
(12) Reissued Patent
Grounds et al.

(10) Patent Number: US RE46,359 E
(45) Date of Reissued Patent: Apr. 4, 2017

(54) VEHICLE MOUNTED DEVICE AND A METHOD FOR TRANSMITTING VEHICLE POSITION DATA TO A NETWORK-BASED SERVER

(76) Inventors: Thomas L. Grounds, Woodland Park, CO (US); Richard A. Geving, Woodland Park, CO (US)

(21) Appl. No.: 12/703,459

(22) Filed: Feb. 10, 2010

Related U.S. Patent Documents

Reissue of:
(64) Patent No.: 6,510,381
Issued: Jan. 21, 2003
Appl. No.: 09/780,195
Filed: Feb. 9, 2001

U.S. Applications:
(62) Division of application No. 10/826,172, filed on Apr. 16, 2004, which is an application for the reissue of Pat. No. 6,510,381.

(60) Provisional application No. 60/181,887, filed on Feb. 11, 2000.

(51) Int. Cl.

| | |
|---|---|
| ***G01S 13/00*** | (2006.01) |
| ***G08G 1/123*** | (2006.01) |
| ***H04M 3/00*** | (2006.01) |
| ***H02G 3/00*** | (2006.01) |
| ***G08G 1/00*** | (2006.01) |

(52) U.S. Cl.
CPC ..... *G08G 1/20* (2013.01)

(58) Field of Classification Search
USPC ..... 701/207, 69, 56–24, 200, 213; 342/357.07; 340/992
See application file for complete search history.

(56) References Cited

U.S. PATENT DOCUMENTS

| | | | | |
|---|---|---|---|---|
| 4,701,760 | A | | 10/1987 | Raoux |
| 4,897,642 | A | | 1/1990 | DiLullo et al. |
| 5,043,736 | A | | 8/1991 | Darnell et al. |
| 5,155,689 | A | | 10/1992 | Wortham |
| 5,557,254 | A | * | 9/1996 | Johnson et al. ..... 340/426.19 |
| 5,673,305 | A | | 9/1997 | Ross |
| 5,742,509 | A | | 4/1998 | Goldberg et al. |
| 5,777,580 | A | | 7/1998 | Janky et al. |
| 5,786,789 | A | | 7/1998 | Janky |
| 5,841,396 | A | | 11/1998 | Krasner |
| 5,874,914 | A | | 2/1999 | Krasner |
| 5,884,221 | A | | 3/1999 | Wortham |

(Continued)

OTHER PUBLICATIONS

Coded Communications Corp., "Las Vegas Fire Department, System Design Document," 1969.

*Primary Examiner* — Matthew C. Graham
(74) *Attorney, Agent, or Firm* — Hayes Soloway P.C.

(57) ABSTRACT

A vehicle mounted device is configured to transmit vehicle position data to a network-based server using a wireless communication system. The device includes first and second processing modules carried by a vehicle. The first module receives positioning signals and processes the signals into vehicle position data representing date and time, and the position, velocity and direction of travel of the vehicle. The second module stores the signals and communicates the signals to a network-based server using a wireless communications system. The signals are storable on-board the device during periods that the device is out of range of the wireless communication system for later transmission to the network-based server.

10 Claims, 5 Drawing Sheets

(56) References Cited

U.S. PATENT DOCUMENTS

| | | | | |
|---|---|---|---|---|
| 5,913,170 | A | 6/1999 | Wortham | |
| 5,917,405 | A * | 6/1999 | Joao | 340/426.17 |
| 5,922,040 | A * | 7/1999 | Prabhakaran | 701/117 |
| 5,959,577 | A | 9/1999 | Fan | |
| 5,987,377 | A | 11/1999 | Westerlage et al. | |
| 6,014,080 | A | 1/2000 | Layson, Jr. | |
| 6,064,336 | A | 5/2000 | Krasner | |
| 6,131,067 | A | 10/2000 | Girerd et al. | |
| 6,148,261 | A | 11/2000 | Obradovich et al. | |
| 6,204,807 | B1 | 3/2001 | Odagiri et al. | |
| 6,204,808 | B1 | 3/2001 | Bloebaum et al. | |
| 6,208,290 | B1 | 3/2001 | Krasner | |
| 6,295,449 | B1 * | 9/2001 | Westerlage et al. | 455/422.1 |
| 6,510,381 | B2 * | 1/2003 | Grounds et al. | 701/517 |

* cited by examiner

VEHICLE MOUNTED DEVICE AND A METHOD FOR TRANSMITTING VEHICLE POSITION DATA TO A NETWORK-BASED SERVER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

[Continuation-in-part of provisional application No. 60/181,887, filed on Feb. 11, 2000] *This reissue application Ser. No. 12/703,459 filed Feb. 10, 2010 is the second divisional reissue application which has been filed for the reissue of U.S. Pat. No. 6,510,381 which issued on Jan. 21, 2003 based on U.S. application Ser. No. 09/780,195 filed Feb. 9, 2001 entitled "Vehicle Mounted Device and a Method for Transmitting Vehicle Position Data to a Network Based Server", which makes reference to, claims priority to, and claims the benefit of U.S. Provisional Application No. 60/181,887, filed on Feb. 11, 2000, entitled "Smart Cable." The first reissue application is Ser. No. 10/826,172 filed on Apr. 16, 2004 which includes all the claims allowed and copied from the first divisional reissue application Ser. No. 11/943,479 filed on Nov. 20, 2007 which is now abandoned.*

BACKGROUND OF THE INVENTION

1. Field of the Invention

The present invention relates to an apparatus and method for ascertaining the position, velocity and direction of travel of a vehicle at a remote location and for transmitting such information to a network-based server using a wireless communication system.

2. Description of the Related Art

Various apparatus and methods for ascertaining the position of individual vehicles and for communicating that information to a user at a location remote from said vehicles are known in the art. For example, U.S. Pat. No. 5,043,736 to Darnell, et al., discloses a cellular position locating system for ascertaining the latitude and longitude of an individual or object at a remote location and transmitting such information to a base station using a portable hand-held remote unit. The portable unit includes a receiver circuit for use with a satellite navigation system, a microprocessor for analyzing coded signals, cellular phone and modem circuits for transmitting encoded signals to a base station and a time of day clock. The base station includes a computational system for decoding position data and a visual display device for presenting the remote unit map coordinates.

In U.S. Pat. No. 5,742,509, Goldberg, et al., discloses a personal tracking system integrated with a base station. The tracking system includes a remote unit that includes a location determination means, a microprocessor, a modem, and a communication means connected to the modem. The base station includes a computer with software and a modem. The remote unit and the base station communicate with one another through a communication link.

In U.S. Pat. No. 6,131,067, Girerd, et al., discloses a client-server computer network and the use of such a network to access remote sensors having associated position determination sensors. In one embodiment of the invention, a remote sensor transmits positioning data to a server where it is analyzed to derive the location of the remote sensor. The location so determined is then transmitted from the server to the client and is displayed at the client so that the user can identify the location of the remote sensor. Use of the Internet as the client-server computer network is disclosed, along with use of a web page at the server having means for the user to identify a particular remote sensor.

The available means with which to determine the position of a remote sensor, or of a plurality of remote sensors, can be improved upon. For instance, there is a need to reduce the elapsed time that is presently required of a user in determining the position of each vehicle of a fleet of vehicles—e.g., each rental car of a fleet of rental cars or each truck of a fleet of transportation trucks. The present invention improves upon the currently available means for determining the several positions of a plurality of remote sensors by combining a fully integrated remote positioning sensor with currently available high speed telecommunications networks. The fully integrated remote positioning sensor carries out all position determining calculations, including and desired differential corrections and auxiliary calculations, on-board at the remote location. This enables all position and tracking data to be readily available for continuous or intermittent transmission of said data to a network-based server for data-basing the positional information. The data-based information is then available, on demand, when a user accesses the server to view positional information with regard to one or a plurality of vehicles. This obviates the need for polling the remote vehicle and substantially reduces the time required to access the positional information.

The device is also configured to store data on-board at the remote location during periods that the device is outside the communication range of a wireless network, and to automatically transmit the stored data as soon as the device returns to within the communication range of the wireless network. This last feature permits a history of the vehicle route and speed, etc., to be preserved for periods in which the vehicle is outside the communication range of the wireless network.

SUMMARY OF THE INVENTION

A vehicle mounted device is configured to transmit vehicle position data to a network-based server using a wireless communication system. A preferred embodiment of the device includes first and second processing modules carried by a vehicle. The first processing module includes a positioning system receiver configured to receive positioning signals from at least one source remote from said vehicle and to process said positioning signals into vehicle position data representing date and time, and the position, velocity and direction of travel of the vehicle.

The second processing module includes a data storage device configured to store the vehicle position data, a wireless communication system link for connecting the second processing module to a wireless communication system, and a processor configured to control intermittent transmission of the vehicle position data to the wireless communication system link for subsequent transmission over the wireless communication system and, finally, to a network-based server. The processor is further configured to control transmission of said position data to and from the data storage device, and to process incoming data sent from the network-based server.

In a preferred embodiment, the processor is a microcontroller that includes an erasable programable read only memory ("EPROM") and a random access memory ("RAM"). The data storage device is an electrically erasable programable read only memory ("EEPROM") or, more generally, an electrically erasable programmable memory. The positioning system receiver is a global positioning system ("GPS") receiver in communication with, preferably, four or more GPS satellites. The wireless communication system is selected from the group consisting of wireless LAN/WAN (local area network/wide area network), AMPS (advanced mobile phone system), Satellite (satellite based system communication system), iDEN™, TDMA (time division multiple access), CDMA (code division multiple access), CDPD (cellular digital packet data) and GSM (groupe special mobile) infrastructures, while the network-based server is a computer connected to a network, such as the Internet, that can be accessed through a web-browser by a user logged on to the Internet. Alternative embodiments include use of the present invention with Intranet type networks.

A power supply powers the first and second processing modules. A first cable conducts power from the power supply to the second processing module. A second cable conducts power from the second module to the first module, and transmits vehicle position data from the first processing module to the second processing module.

The wireless communication system link is a wireless telephone, removably connected to the second processing module, and configured to transmit the vehicle position data over the wireless communication system to a network-based server. Alternative embodiments include use of wireless links between the second processing module and the wireless telephone, rather than removable connections. The processor is configured to establish a wireless communication between the wireless telephone and the network-based server upon start-up of the device. The processor is also configured to control transmission of the vehicle position data at predetermined periodic intervals during normal operation.

During an interruption in the wireless communication, the processor is configured to cease transmission of the vehicle position data and, rather, direct the data to be stored in the on-board storage device. The processor is also configured to periodically attempt to reestablish the wireless communication between the wireless telephone and the network-based server during such interruption. The processor is further configured to retrieve the data from the storage device and transmit it over the wireless communication system to the network-based server following reestablishment of the wireless connection.

The second processing module further includes at least one sensory input connected to the processor, where such sensory input is connected to an event sensor carried by the vehicle. The event sensor is configured to detect the occurrence of an event involving the vehicle and to transmit information regarding the event to said sensory input for processing by the processor.

A software program is configured to control initialization of the processor and the storage device upon start-up of the vehicle mounted device. The program is further configured to control enabling of interrupts and to check for the presence and functionality of all hardware and the operational mode of the vehicle mounted device. Finally, the program is further configured to control loading of operational setup parameters stored in said storage device and to check for the presence of vehicle position data stored in the storage device.

The periodic transmission of the vehicle position data is based on predetermined distance intervals, time intervals, polling, speed triggers, vehicle stop, vehicle start, or signals from the sensory inputs. The first and second modules are positionable within first and second housings, respectively, and the power supply means is a plug configured for insertion into a vehicle cigarette lighter. Alternatively, the power supply means may be a wire directly connected to the vehicle storage battery or fuse box.

BRIEF DESCRIPTION OF THE DRAWINGS

In the drawings which illustrate the preferred embodiments of carrying out the invention.

DETAILED DESCRIPTION

Figure 1:
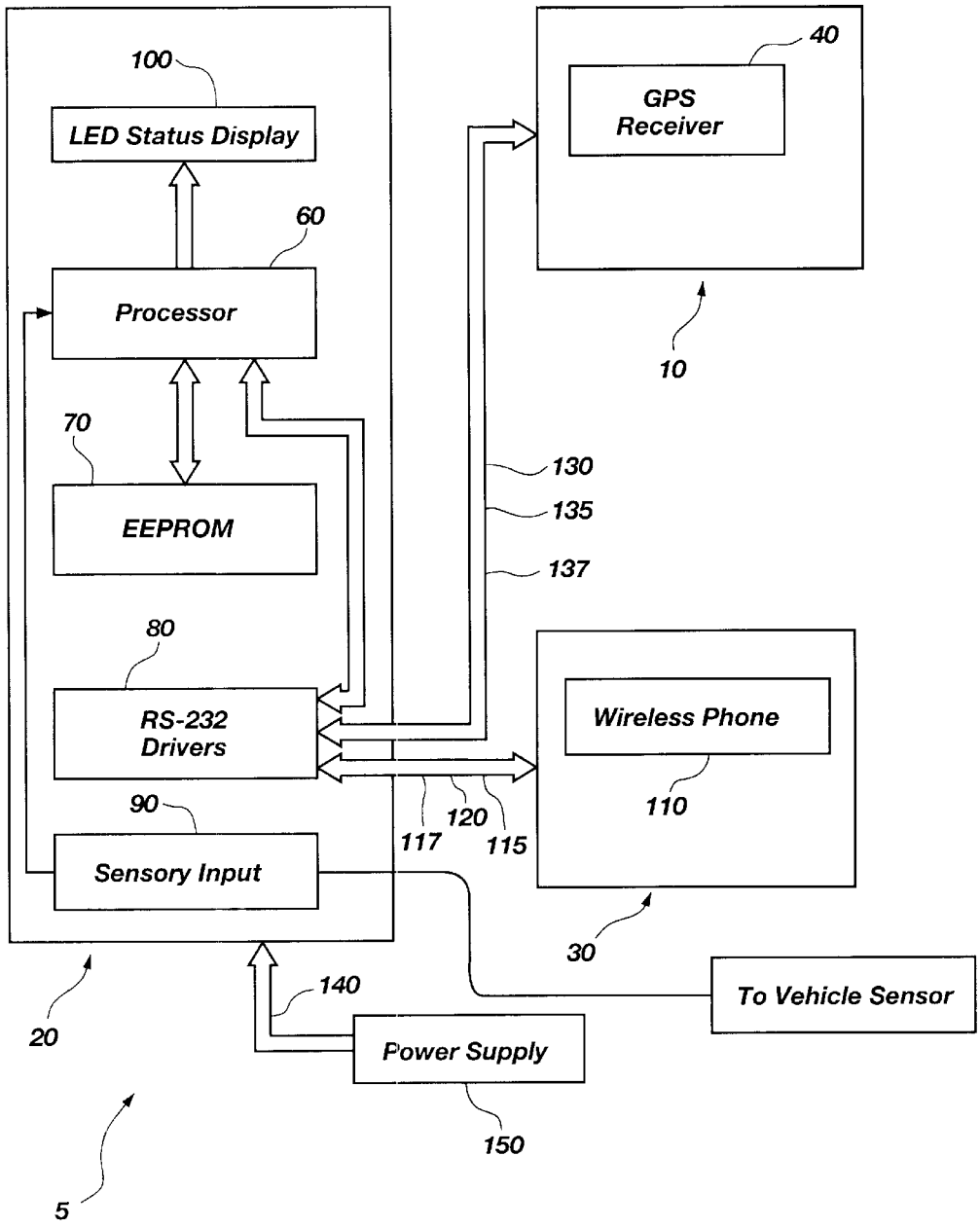
FIG. 1 is a block diagram of a preferred embodiment of the device of the present invention.
Figure 5:
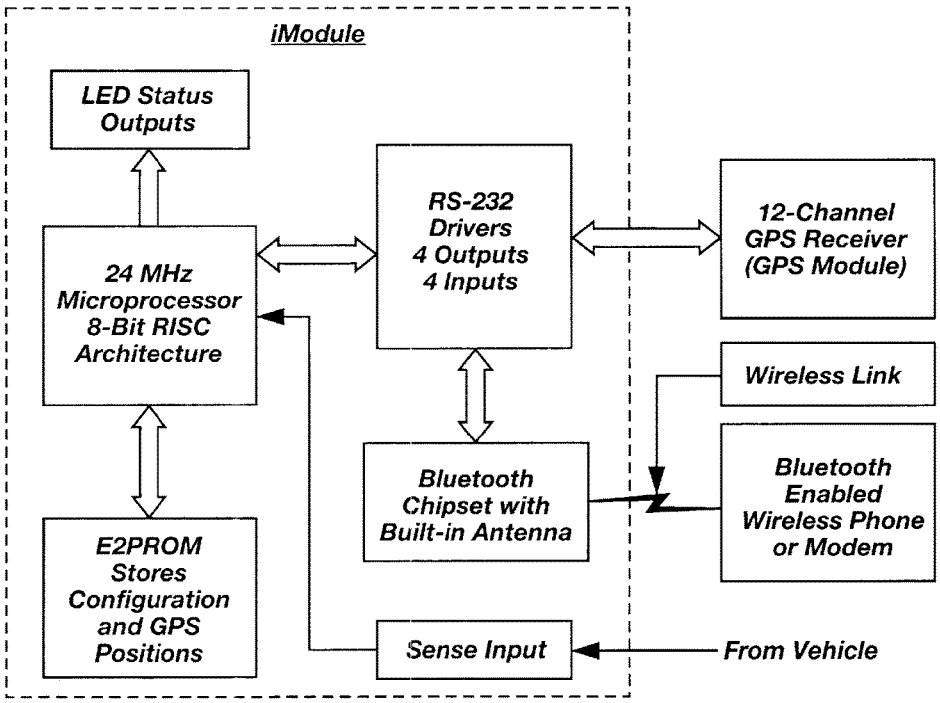
FIG. 5 is a block diagram of the preferred embodiment of the present invention showing a wireless connection between the vehicle mounted device and the wireless phone or modem.

Referring to FIG. 1, a preferred embodiment of the vehicle mounted device 5 includes a first processing module 10, a second processing module 20, and a wireless communication system link 30. The first processing module 10 includes a global positioning system ("GPS") receiver 40 for receiving and processing satellite signals into vehicle position data. The second processing module 20 includes a processor 60, an electrically erasable programmable read only memory ("EEPROM") 70 or, more generally, an electrically erasable programmable memory, at least one RS-232 driver 80, at least one sensory input 90, and a light emitting diode ("LED") display 100. Wireless communication system link 30 is a wireless phone 110, which is removably attached to the second processing module 20 through a connector means 115. An alternative embodiment includes use of a wireless link between the second processing module and the wireless communication system link 30. Referring to FIG. 5, an alternative embodiment includes the use of a wireless link between second processing module 20 and wireless phone or modem 110. The wireless link may consist of a Bluetooth Chipset and built-in antenna housed within second processing module 20 and a compatible Bluetooth Chipset and built-in antenna housed within wireless phone or modem 110. Said wireless link, shall adhere to the Bluetooth standard for wireless communication between Bluetooth enabled devices.

Power supply 150 provides power to second module 20 through power supply cable 140. Power is supplied to wireless phone 110 through an on-board storage battery typical for wireless telephones, and power is supplied to GPS receiver 40 through power conductor means 135 in cable 130. Data communication between first module 10 and second module 20 is provided through data bus means 137, which are contained in cable 130, and data communication between wireless phone 110 and second module 20 is provided through data bus means 117, which are contained in cable 120.

More specifically, a preferred embodiment of the vehicle mounted device 5 includes:

(i) a 24 MHz, 8-bit CMOS Microcontroller, PIC17C256A, 68-pin PLCC for processor 60;

(ii) a 256K-bit serial EEPROM, 8-pin SO1C for EEPROM 70;

(iii) four +5V RS-232 Transceivers, 24-pin SSOP for RS-232 driver 80;

(iv) four LED's for indicating GPS status, phone status, wireless coverage and power status for display 100;

(v) a DB-9 male connector for an RS-232 connection to the phone for connector means 115; and (vi) a Garmin, 12-channel GPS receiver, model GPS35-HVS for GPS receiver 40.

Figure 2:
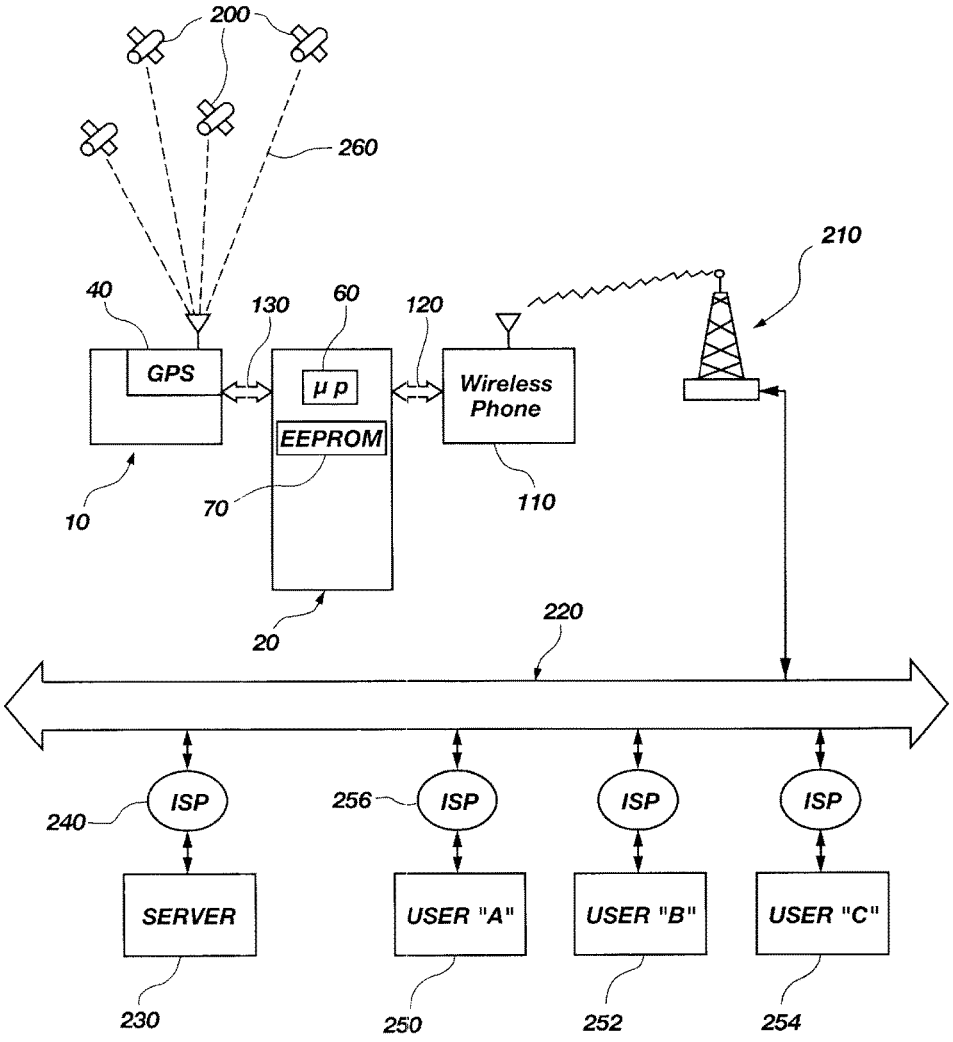
FIG. 2 is a block diagram of the vehicle mounted device of the present invention in communication with a network-based server using a wireless communication system.
Figure 3:
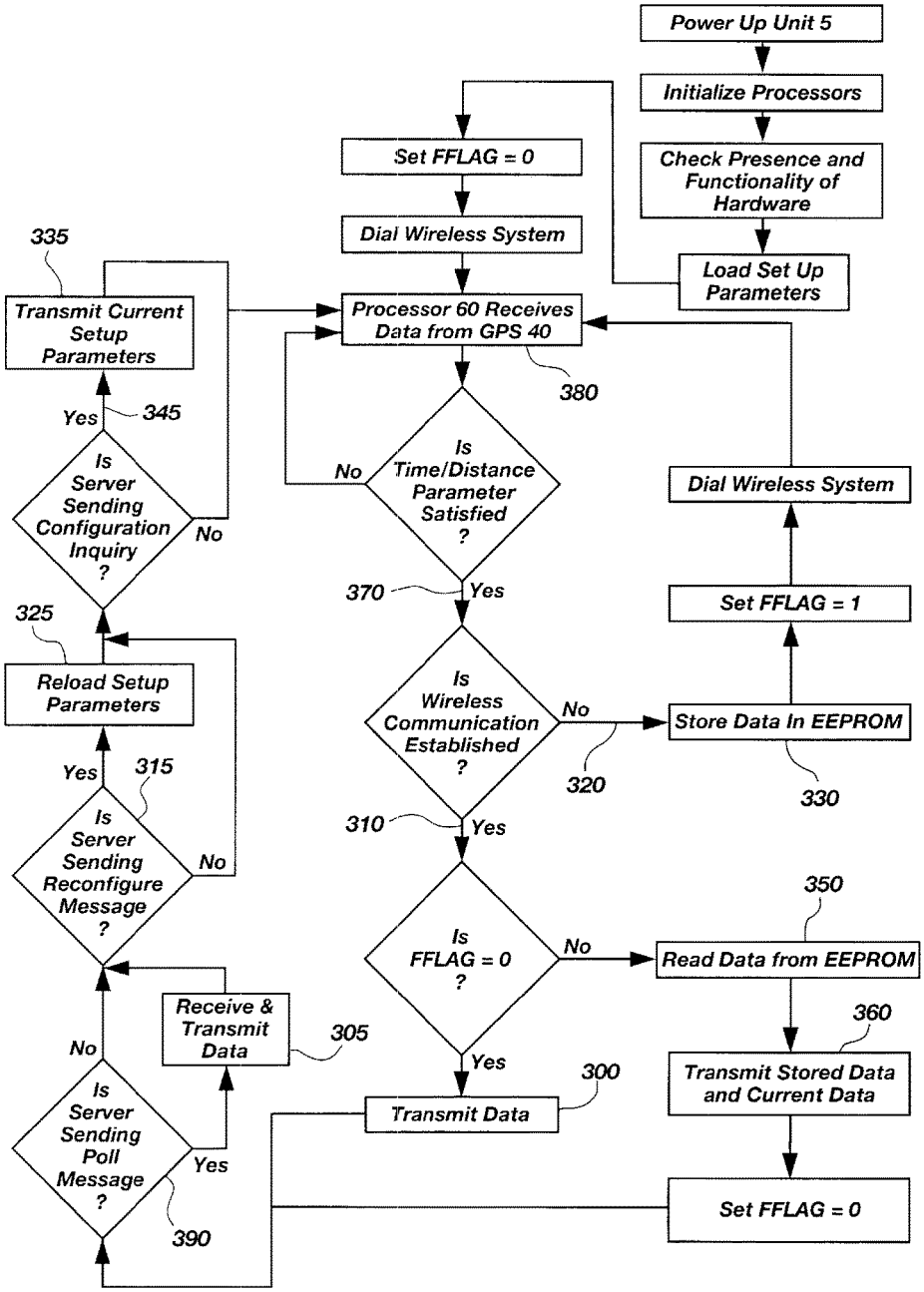
FIG. 3 is a flowchart depicting the basic operational steps of a preferred embodiment of the device of the present invention.
Figure 4:
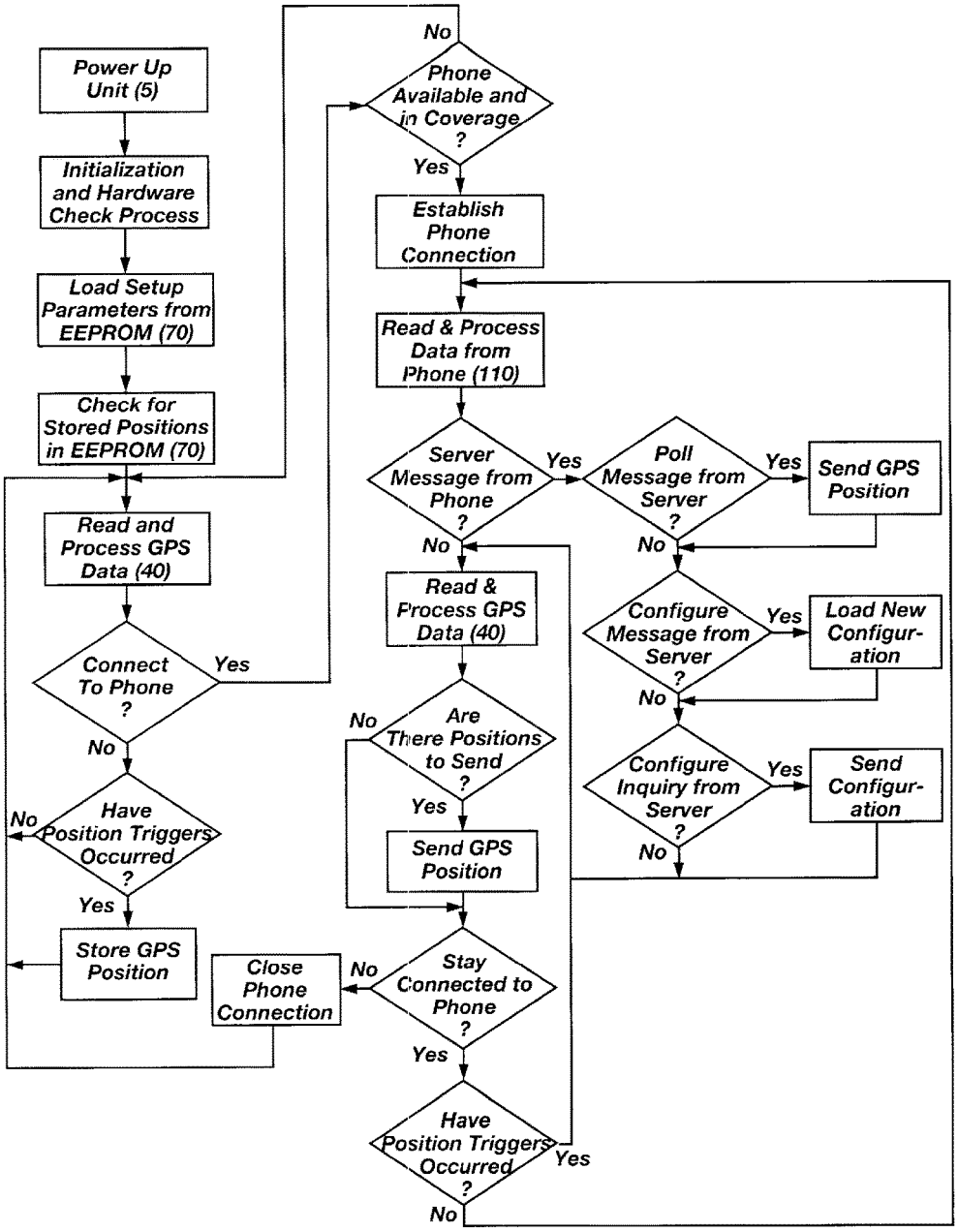
FIG. 4 is a second flowchart depicting operational steps of a second preferred embodiment of the present invention.

Referring now to FIGS. 2 and 3, GPS receiver 40 is configured to receive signals 260 from satellites 200 and to convert said signals into vehicle position data, which includes data representing the date and time, the number of satellites tracked, the GPS lock status, and the vehicle position, velocity and direction of travel. GPS receiver 40 is further configured to transmit 380 said data to processor 60 following processing of signals 260 into vehicle position data. Processor 60 is configured to then transmit the vehicle position data, along with any status data representing the status of sensory input 90, to wireless phone 110 for transmission to network server 230. Processor 60 is further configured to make such communications intermittently, depending upon whether the value of the time or distance parameters that are stored in EEPROM 70 are satisfied 370.

The operation of vehicle device 5 commences when the device receives power from power supply 150, which is supplied to device 5 through power cable 140. Upon receiving power, processor 60 is initialized. Processor 60 then checks for the presence and functionality of all hardware contained in device 5, and then loads the setup parameters in EEPROM 70, which include the host IP and port address, the dial string, the Internet Service Provider ("ISP") phone number, user name and password, the time and distance reporting rates for both in and out of coverage reporting, the speed trigger, the sense input trigger, and enablement and disablement triggers. Following loading of setup parameters, device 5 attempts to establish a wireless connection over wireless communication system 210 to server 230 for automatic, but intermittent, transmission of vehicle position data. A point-to-point protocol ("PPP") connection is established between second module 20 and wireless phone 110 using a packet data or circuit-switched connection depending on the wireless communications system 210. Once the PPP connection is established, vehicle position data updates are transmitted, intermittently, each time one of the configured timers, either time or distance, has expired 370. At that time, a vehicle position data update is constructed as a User Diagram Protocol ("UDP") packet and transmitted over the wireless communication system 210 to server 230.

Referring still to FIGS. 2 and 3, processor 60 is configured to intermittently transmit 300 the vehicle position data to wireless phone 110 during periods when wireless phone 110 is in communication 310 with server 230. Wireless phone 110 then communicates the vehicle position data over wireless communications system 210 to network 220. Network 220 communicates the data through network service provider 240 to server 230. It is noted that wireless communication system 210 may be selected from the group of infrastructures that include wireless LAN/WAN (local area network/wide area network), AMPS (advanced mobile phone system), Satellite (satellite based system communication system), iDEN™, TDMA (time division multiple access), CDMA (code division multiple access), CDPD (cellular digital packet data) and GSM (groupe special mobile) infrastructures. It is further noted that server 230 is configured to communicate with, and store vehicle position data received from, a plurality of individual vehicle mounted devices 5. In a preferred embodiment of the invention, network 220 is the Internet, although an alternative embodiment may have an Intranet as network 220.

During periods when wireless phone 110 is not in communication 320 with server 230—e.g., when wireless phone 110 is disconnected or out of coverage of wireless communication system 210—processor 60 directs the vehicle position data to EEPROM 70 for storage 330 until wireless phone 110 is able to reestablish communication with server 230. Processor 60 is configured to store said data sequentially in EEPROM 70 for subsequent retrieval 350. Use of a 256-K Bit Serial EEPROM, such as is used in a preferred embodiment, permits storage of up to 509 GPS positions in EEPROM 70. In the event all 509 storage locations are filled during a period when communication is not established 320, processor 60 is configured to overwrite the least recent data entries with current data entries. Once wireless phone 110 reestablishes communication with server 230, processor 60 retrieves 350 the vehicle position data stored in EEPROM 70 and transmits it to wireless phone 110 for subsequent communication 360 of said data over wireless communication system 210 to network 230.

Further referencing FIGS. 2 and 3, a user with access to a computer and network browser—USER "A" 250, for example—logs on to network 220 through network service provider 256 and accesses server 230. USER "A" 250 is then able to view the vehicle position data for a single vehicle or for a fleet of vehicles. Wireless phone 110 is also configured to receive messages sent by server 230 and to direct those messages back to processor 60. This permits USER "A" 250, for example, to communicate messages like Internet Control Management Protocol Echo ("ICMP") ping messages, configuration messages, or poll messages to wireless phone 110, which is configured to transmit those messages to processor 60.

Receipt by device 5 of poll message 390 allows the user to request an immediate position update be determined and transmitted 305 from vehicle device 5 to server 230. Receipt by device 5 of configuration message 315 allows the user to change and reload 325 the setup parameters stored in EEPROM 70. For example, configuration message 315 allows the user to change and reload 325 the setup parameters in order to change the interval at which data is transmitted 370 from device 5 to server 230. Processor 60 is further configured to respond 335 to a configuration inquiry 345 from server 230 regarding the current configuration of parameters stored in EEPROM 70.

It is noted that processor 60 is configured to operate using a software program that controls initialization of said processor and said storage device upon start-up of said vehicle mounted device, that controls enabling of interrupts and checking for the presence and functionality of all hardware and operational modes of said vehicle mounted device, and that controls loading of operational setup parameters stored in said storage device and checking for the presence of vehicle position data stored in said storage device.

A preferred embodiment of the invention also enables indirect addressing to be used in the vehicle positioning process. For example, when vehicle position data is transmitted to a network-based server over a wireless network, a wireless carrier may translate the IP address ("Internet protocol address") that identifies the transmitting wireless communication system link—e.g., the wireless phone or modem—making it difficult or impossible to data-base the vehicle position data accurately. For devices and methods that depend on the IP-address of the wireless phone or modem to identify the vehicle mounted device, an identification problem can result. In order to overcome the problem, processor 60 is further configured to add an identification code to the vehicle position data and transmit the identification code along with the vehicle position data. The identification code is identified by the network-based server, enabling the vehicle position data to be data-based at the network-based server consistent with the transmitting vehicle mounted device. This further enables the device to be used with several different phones and wireless carriers, regardless of whether the carrier translates the IP-address code or not. In other words, this feature allows use with wireless systems that implement a firewall between their network and the Internet, where the wireless systems provider translates the provisioned IP address in the wireless phone or modem to a "Routable" IP address on the Internet. This feature further allows the vehicle mounted device to be connected to any model wireless phone or modem, where each wireless phone or modem has a uniquely provisioned IP-address. Stated otherwise, any wireless phone or modem can be connected to the same vehicle mounted device, and the network-based server will identify that device based on the data sent with the vehicle position data, and not on the IP-address of the wireless phone or modem. This method is referred to as indirect addressing because the network-based server indirectly identifies each vehicle mounted device by the code sent with the vehicle position data, and not the IP address that routes the message to the network-based server.

Upon power up and initialization of vehicle device 5, processor 60 completes an initialization and hardware check of vehicle device 5. Next, the setup parameters for vehicle device 5 are loaded from EEPROM 70. The setup parameters include server 230 IP and Port addresses, the dial string for wireless phone 110, the dial rate and hang time for the connection to wireless phone110, the sense trigger levels, the speed trigger and the time and distance parameters for position updates both in and out of wireless system 210 coverage.

After initialization and configuration of vehicle device 5, processor 60 checks for stored positions and then starts to process GPS data from GPS receiver 40. Next, processor 60 determines if a phone connection should be established to wireless phone 110. If position data is stored or a connection to wireless phone 110 is required based on setup parameters, processor 60 attempts to make a connection to wireless phone 110. If wireless phone 110 is not present, processor 60 returns to the process of reading GPS data from GPS receiver 40. With wireless phone 110 not present and the process of reading GPS data complete, processor 60 checks if position triggers have occurred and if so, stores that GPS position in EEPROM 70. If no position triggers have occurred, processor 60 returns to reading and processing GPS data.

If wireless phone 110 is present, processor 60 will establish a PPP connection with wireless phone 110. After a PPP connection is established with wireless phone 110, processor 60 will check and process any data from wireless phone 110. If a data message is received from wireless phone 110 via Server 230, processor 60 will process data message based on the type of data message. For a Poll message, processor 60 will send the current GPS position of the vehicle. For a Configure message, processor 60 will load the new configuration message which may include Server 230 IP and Port address, dial rate, hang time, speed trigger or time and distance reporting rates. For a Configure Inquiry message, processor 60 will send the current configuration requested which may include Server 230 IP and Port address, dial rate, hang time, speed trigger or time and distance reporting rates. After processing the received data message, processor 60 returns to read and process GPS data.

If no data message is received from wireless phone 110 while vehicle device 5 is connected, processor 60 reads and processes GPS data from GPS receiver 40. After processor 60 processes GPS data, processor 60 checks if there are stored GPS positions or if GPS positions are queued based on setup parameters. If GPS positions are stored or queued, processor 60 sends the positions via wireless phone 110 to Server 230 based on IP and Port addresses in the setup parameters. After sending GPS positions, processor 60 checks if vehicle device 5 should stay connected to wireless phone 110. Based on setup parameters, processor 60 will close the phone connection if appropriate or continue to stay connected and process positions triggers. If position triggers occur, processor 60 will return to read and process GPS Data and then send a GPS position. If position triggers have not occurred, processor 60 will return to read and process data from wireless phone 110.

What is claimed is:

[1. A vehicle mounted device configured to transmit real time vehicle position data from said device to a network-based server for fleet management purposes using a wireless communication system in communication with said network-based server and with said device, comprising:

a first processing module carried by a vehicle for computing real time vehicle position data reflecting real time geographic location of said vehicle, said first processing module including a positioning system receiver for receiving position signals from at least one source remote from said vehicle and for processing said position signals into said real time vehicle position data representing the date, time, and position of said vehicle;

a second processing module for storing said real time vehicle position data and for controlling transmission of said real time vehicle position data to said network-based server, said second processing module including data storage means for storing said real time vehicle position data, wireless communication system connecting means for transmitting data to said wireless communication system, and control means for controlling transmission of said real time vehicle position data to said network-based server, said control means being configured to:

receive said real time vehicle position data from said first processing module, establish a wireless connection to said network-based server for a predetermined period of duration, detect the establishment of a wireless connection, transmit said real time vehicle position data to said network-based server during periods when said connection is established, store said real time vehicle position data in said data storage means when said connection is not established, reestablish said wireless connection to said network-based server following any period that said wireless connection is broken, and retrieve said stored real time vehicle position data from said data storage means following reestablishment of said wireless connection, and thereafter transmit said stored real time vehicle position data to said network-based server, said wireless communication system connecting means including a short-range wireless chipset and built-in antenna housed within said second processing module and a wireless telephone having a compatible short-range wireless chipset and antenna housed within said wireless telephone, wherein said short-range wireless chipset is configured for wireless communication between said second processing module and said wireless telephone and wherein said wireless telephone is configured for wireless communication with said wireless communication system;

a power supply means for powering said first processing module and said second processing module;

a first conductor means connected to said power supply means and to said second processing module, said first conductor means being configured to transmit power from said power supply means to said second processing module; and a second conductor means connected to said first processing module and to said second processing module, said second conductor means being configured to transmit said vehicle position data from said first processing module to said second processing module and being further configured to transmit power from said second processing module to said first processing module;

whereby said vehicle mounted device, in conjunction with said network-based server, enables any one or more of a plurality of fleet managers to simultaneously access said network-based server via a network service provider and thereafter monitor the current and historical real time vehicle position data corresponding to a fleet of vehicles designated to be monitored by a corresponding one of said any one or more of a plurality of fleet managers.]

[2. The vehicle mounted device of claim 1 further including event sensor means attached to said vehicle, wherein said second processing module further includes at least one sensory input connected to said control means, said at least one sensory input being connected to said event sensor means for detecting the occurrence of an event involving the vehicle and transmitting information regarding said event to said sensory input, said event sensor means being positioned on said vehicle.]

[3. The vehicle mounted device of claim 2, wherein said first conductor means has a first power cable, and wherein said second conductor means has a data bus and a second power cable.]

[4. The vehicle mounted device of claim 3, wherein said control means is selected from the group consisting of a microcontroller, a microprocessor and an ASIC device, wherein said data storage means is an electrically erasable programmable memory, wherein said positioning system receiver is a global positioning system ("GPS") receiver, and wherein said at least one source remote from said vehicle is a plurality of GPS satellites.]

[5. The vehicle mounted device of claim 4, wherein said wireless communication system is selected from the group consisting of wireless LAN/WAN, AMPS, Satellite, iDEN™, TDMA, CDMA, CDPD and GSM infrastructures.]

[6. The vehicle mounted device of claim 5, wherein said control means is further configured to initialize all memory and data ports and said storage means upon start-up of said vehicle mounted device, enable of interrupts and check for the presence and functionality of all hardware and operational modes of said vehicle mounted device, load operational setup parameters stored in said storage means and check for the presence of real time vehicle position data stored in said storage means.]

[7. The vehicle mounted device of claim 6, wherein said network-based server is a computer and wherein said network is either the Internet network or Intranet network.]

[8. The vehicle mounted device of claim 7, wherein said first module is positioned within a first housing, wherein said second module is positioned within a second housing, and wherein said power supply means is selected from the group consisting of a plug configured for insertion into a vehicle cigarette lighter, a wire connected to a fuse panel terminal, a wire connected to a vehicle storage battery, and a battery.]

[9. The vehicle mounted device of claim 8, further including receiving means for receiving incoming signals transmitted by said network-based server, said incoming signals including any one or more of ICMP ping messages, configuration messages, or poll messages.]

[10. The vehicle mounted device of claim 9 wherein said control means is further configured to update said setup parameters in response to receiving a configuration message, wherein said control means is further configured to immediately transmit said vehicle position data to said network-based server in response to receiving a poll message.]

[11. The vehicle mounted device of claim 10, wherein said control means is further configured to transmit said vehicle position data to said network-based server at predetermined intervals, said intervals being selected from the group consisting of distance intervals and time intervals.]

[12. The vehicle mounted device of claim 11, wherein said control means is further configured to transmit said vehicle position data to said network-based server upon the occurrence of predetermined triggers, said triggers being selected from the group consisting of speed triggers, vehicle start triggers, vehicle stop triggers and sensory input triggers.]

[13. The vehicle mounted device of claim 12, wherein said control means is further configured to establish a wireless connection to said network based server for predetermined time intervals.]

[14. The vehicle mounted device of claim 1, wherein said control means is further configured to add an identification code, that uniquely identifies the vehicle mounted device, to said vehicle position data and to transmit said identification code along with said vehicle position data.]

[15. A method for transmitting vehicle position data to a network-based server for fleet management purposes using a vehicle position locating device carried by a vehicle located remotely from said server and a wireless communication system in communication with both said network-based server and said device, said method comprising the steps:

establishing a wireless connection between the vehicle position locating device and the network-based server located remote from said vehicle position locating device;

receiving position signals by said vehicle position locating device from at least one source remote from said vehicle and processing said position signals into vehicle position data representing date and time, and the position, velocity and direction of travel of said vehicle;

detecting whether said wireless connection is established;

transmitting said vehicle position data to said network-based server during periods when said wireless connection is established;

storing said vehicle position data to a storage device when said wireless connection is not established;

reestablishing said wireless connection following any period that said wireless connection is broken; and retrieving said stored vehicle position data from said storage device following reestablishment of said wireless connection, and thereafter transmitting said stored vehicle position data to said network-based server;

whereby said vehicle mounted device, in conjunction with said network-based server, enables any one or more of a plurality of fleet managers to simultaneously access said network-based server via a network service provider and thereafter monitor the current and historical real time vehicle position data corresponding to a fleet of vehicles designated to be monitored by a corresponding one of said any one or more of a plurality of fleet managers;

wherein said vehicle position locating device comprises:

a first processing module carried by a vehicle for computing real time vehicle position data reflecting real time geographic location of said vehicle, said first processing module including a positioning system receiver for receiving position signals from at least one source remote from said vehicle and for processing said position signals into said real time vehicle position data representing the date, time, and position of said vehicle;

a second processing module for storing said real time vehicle position data and for controlling transmission of said real time vehicle position data to said network-based server, said second processing module including data storage means for storing said real time vehicle position data, wireless communication system connecting means for transmitting data to said wireless communication system, and control means for controlling transmission of said real time vehicle position data to said network-based server, said control means being configured to:

receive said real time vehicle position data from said first processing module, establish a wireless connection to said network-based server for a predetermined period of duration, detect the establishment of a wireless connection, transmit said real time vehicle position data to said network-based server during periods when said connection is established, store said real time vehicle position data in said data storage means when said connection is not established, reestablish said wireless connection to said network-based server following any period that said wireless connection is broken, and retrieve said stored real time vehicle position data from said data storage means following reestablishment of said wireless connection, and thereafter transmit said stored real time vehicle position data to said network-based server, said wireless communication system connecting means including a short-range wireless chipset and built-in antenna housed within said second processing module and a wireless telephone having a compatible short-range wireless chipset and antenna housed within said wireless telephone, wherein said short-range wireless chipset is configured for wireless communication between said second processing module and said wireless telephone and wherein said wireless telephone is configured for wireless communication with said wireless communication system;

a power supply means for powering said first processing module and said second processing module;

a first conductor means connected to said power supply means and to said second processing module, said first conductor means being configured to transmit power from said power supply means to said second processing module; and a second conductor means connected to said first processing module and to said second processing module, said second conductor means being configured to transmit said vehicle position data from said first processing module to said second processing module and being further configured to transmit power from said second processing module to said first processing module.]

[16. The method of claim 15, wherein said at least one source is a plurality of GPS satellites.]

[17. The method of claim 16, wherein said network-based server is a computer and wherein said network is the Internet.]

[18. The method of claim 15, wherein said method further includes addition of an identification code, that uniquely identifies the vehicle mounted device, to said vehicle position data and to transmit said identification code along with said vehicle position data.]

*19. A system for tracking the location of objects comprising:*

*a network-based server connected to a network;*

*a device carried by the object and configured to transmit real time data, the device including:*

*a first processing module to compute said real time data reflecting a real time geographic location of said object, said first processing module including a positioning system receiver to receive position signals from at least one remote source and to process said position signals into said real time data representing the position of said object at a select time, and*

*a second processing module in communication with said first processing module and configured to receive and to store said real time data and to control transmission of said real time data to said network-based server, said second processing module including*

*a data storage device to receive and store said real time data,*

*a transceiver connected to a communication system to transmit said real time data, and*

*a controller to control transmission of said real time data to said network-based server, said controller being configured to control receipt of said real time data from said first processing module, cause a wireless connection to said network-based server to be established for a set period of duration, detect establishment of said wireless connection, cause said communication system transceiver to transmit said real time data to said network-based server during periods when said wireless connection is established, cause said data storage device to store said real time data in said data storage device when said wireless connection is not established, cause reestablishment of said*

*wireless connection to said wireless communication system transceiver following any period that said wireless connection is not established, and cause said stored real time data to be retrieved from said data storage device following reestablishment of said wireless connection, and thereafter cause said communication system transceiver to transmit said stored real time data to said network-based server; and*

*a power supply for supplying power via a first conductor connected to said second processing module and from said second processing module via a second conductor connected to said first processing module; and*

*said network-based server being connected to a network and said network-based server being configured to supply a configuration message via said network and said transceiver to said second processing module and to said controller to change the interval at which said real time data is transmitted from the device to said network-based server.*

*20. The system of claim 19, wherein the controller transmits said real time data to said network-based server during periods when said object travels for at least one of a set time period and a set distance.*

*21. The system of claim 19, further including an event sensor attached to said object, wherein said second processing module further includes at least one sensory input connected to said controller, said at least one sensory input being connected to said event sensor for detecting the occurrence of an event involving said object and transmitting information regarding said event to said sensory input.*

*22. The system of claim 19, wherein said controller is selected from the group consisting of a microcontroller, a microprocessor and an ASIC device, wherein said data storage device is an electrically erasable programmable memory, wherein said positioning system receiver is a global positioning system receiver, and wherein said at least one source remote from said object is a plurality of global positioning system satellites.*

*23. The system of claim 19, wherein said wireless communication system is configured to receive incoming signals transmitted by said network-based server, and wherein said incoming signals include at least one of ICMP ping messages, configuration messages, or poll messages.*

*24. The system of claim 19, wherein said controller is further configured to update setup parameters in response to receiving a configuration message, wherein said controller is further configured to immediately transmit said real time data to said network-based server in response to receiving a poll message.*

*25. The system of claim 19, wherein said controller is further configured to transmit said real time data to said network-based server upon the occurrence of predetermined triggers, said triggers including at least one of a speed trigger, an object start trigger, an object stop trigger and a sensory input trigger.*

*26. The system of claim 19, wherein said controller is further configured to add an identification code that uniquely identifies the device to said real time data and to transmit said identification code along with said real time data.*

*27. The device of claim 19, further comprising a wireless connection between said second processing module and said first processing module for transmitting said real time data.*

*28. The device of claim 19, further comprising a wired communication channel coupled to said first processing module and said second processing module for transmitting said real time data and being further configured to transmit power from said second processing module to said first processing module.*

* * * * *